United States Patent [19]

Drent

[11] Patent Number: 5,059,676

[45] Date of Patent: Oct. 22, 1991

[54] POLYMERS OF CARBON MONOXIDE AND BICYCLIC UNSATURATED CARBOXYLIC ACID COMPOUND

[75] Inventor: Eit Drent, Amsterdam, Netherlands

[73] Assignee: Shell Oil Company, Houston, Tex.

[21] Appl. No.: 527,923

[22] Filed: May 24, 1990

[30] Foreign Application Priority Data

Sep. 25, 1989 [NL] Netherlands .................. 8902383

[51] Int. Cl.$^5$ ............................................. C08G 67/02
[52] U.S. Cl. .................................. 528/271; 528/392; 528/405
[58] Field of Search .................. 528/271, 392, 405

[56] References Cited

U.S. PATENT DOCUMENTS 3,694,412 9/1972 Nozaki ............................ 260/63 CQ
4,960,857 10/1990 Drent .................................. 528/271

FOREIGN PATENT DOCUMENTS 121965 10/1984 European Pat. Off. .
181014 5/1986 European Pat. Off. .
213671 3/1987 European Pat. Off. .
257663 3/1988 European Pat. Off. .

Primary Examiner—Harold D. Anderson

[57] ABSTRACT

Novel linear alternating polymers wherein moieties derived from carbon monoxide alternate with moieties derived from a bicyclic unsaturated carboxylic acid or carboxylic acid anhydride, and optionally alternate with moieties derived from ethylene, and wherein at least a portion of the carboxylic acid or carboxylic acid anhydride functionality is present as higher alkyl ester, are produced by contacting carbon monoxide, bicyclic unsaturated carboxylic acid or carboxylic acid anhydride, and optionally, ethylene, under polymerization conditions in the presence of a higher alkanol and a catalyst composition formed from a palladium compound, the anion of a strong non-hydrohalogenic acid and a bidenate ligand of phosphorus.

15 Claims, No Drawings

POLYMERS OF CARBON MONOXIDE AND BICYCLIC UNSATURATED CARBOXYLIC ACID COMPOUND

FIELD OF THE INVENTION

This invention relates to linear alternating polymers of carbon monoxide and certain ethylenically unsaturated compounds. More particularly, the invention relates to such linear alternating polymers of carbon monoxide, a bicyclic unsaturated carboxylic acid or carboxylic acid anhydride, and optionally, ethylene. The polymers are produced in the presence of a higher alkanol as reaction diluent and the carboxylic acid functionality of the polymer product is at least partially in the form of a higher alkyl ester.

BACKGROUND OF THE INVENTION

The class of lInear alternating polymers of carbon monoxide and ethylenically unsaturated compound is known in the art. An early production of such polymers is disclosed by a number of U.S. patents to Nozaki oi which U.S. Pat. No. 3,694,412 is illustrative. More recently, processes for the production of linear alternating polymers are shown by a number of published European Patent Applications including 121,965, 181,014, 213,671 and 257,663. Many, if not most, of the available processes are directed to the produciion of linear alternating polymers of carbon monoxide and acyclic ethylenically unsaturated hydrocarbons but the scope of the polymerization process is not so limited. Somewhat special considerations do apply for the polymerization of compounds that are cyclic and/or nonhydrocarbon.

A copending U.S. patent application, Ser. No. 379,839, filed July 14, 1989, is directed to the production of linear alternating polymers of carbon monoxide and cyclic compounds illustrated by 5-norbornene-2,3-dicarboxylic acid anhydride. The reactants are contacted in methanol as a reaction diluent and a lower olefin such as ethylene must be present. Even in the presence of ethylene the polymer product is a copolymer derived from carbon monoxide and 5-norbornene-2,3-dicarboxylic acid anhydride and terpolymer products are not observed. Because of the presence of reactive acid anhydride groups and the methanol reaction diluent, a portion of the norbornene-type monomeric units are observed in the form of methyl esters.

One possible application for linear alternating polymers broadly would be as pour point depressants for paraffin-based motor oils if the polymers contained long-chain alkyl groups depending from the polymer chain. However, direct polymerization of carbon monoxide and higher olefinic hydrocarbons, e.g., an a-olefin of 8 or more carbon atoms, leads to products which are not entirely satisfactory ior this purpose. It would be of advantage to provide other linear alternating polymers, both copolymers and terpo!ymers, which contain long chain alkyl groups as pendant substituents of the polymer chain.

SUMMARY OF THE INVENTION

The present invention provides certain novel po)ymers which contain pendant long chain or higher alkyl carboxylate groups and a process for the productIon thereof. More particularly, the invention provides for the production of copolymers of carbon monoxide and a moiety derived from a bicyclic unsaturated carboxylic acid anhydride, or optionally terpolymers if ethylene is additionally present in the reaction mixture, by polymerization of the monomeric reactants in the presence of a palladium-containing catalyst composition and a higher alkanol reaction diluent. The carboxylic acid or acid anhydride moieties present in the bicyclic monomer are at least partially converted to higher alkyl este moieties by reaction with the alkanol diluent

DESCRIPTION OF THE INVENTINO

The novel polymers of the invention comprise linear alternating polymers derived from carbon monoxide, a bicyclic unsaturated carboxylic acid or carboxylic acid anhydride, and optionally, ethylene. The polymers are produced by contacting the monomeric reactants in the presence of a catalyst composition and, as a reaction diluent, a higher alkanol. In related processes where a lower alkanol, e.g., methanol, is employed as the reaction diluent, a lower a-olefin such as ethylene must he present in order to obtain a copolymeric product and even in the presence of ethylene a terpolymeric Product is not obtained. In both cases the alcohol reaction diluent reacts at least in part with the monomeric moieties of bicyclic acid or anhydride and at least a portion of the polymer product contains alkyl groups as carboxylic acid esters. ln the case of the polymers of the present invention the presence of higher alkyl groups depending irom the polymer chain provides increased hydrocarbon solubility. This increased solubility enables usage of the present polymers as engine oil additives, e.g., pour point depressants.

The polymers oi the invention are the linear alternating polymers of carbon monoxide and ethylenically unsaturated compound which are now conventionally referred to as polyketones or polyketone polymers. The carbon dioxide moiety and a moiety derived irom the ethylenically unsaturated compound alternate throughout the polymer chain and the polymer contains substantially one molecule of unsaturated compound for each molecule of carbon monoxide. Expressed differently, the polyketone polymers are represented by the repeating formula

$$\operatorname*{+}_{\mathrm{C}}^{\mathrm{O}}\operatorname*{-}_{\mathrm{G}}\operatorname*{+} \qquad (\mathrm{I})$$

wherein G is the moiety of ethylenically unsaturated compound polymerized through the ethylenic unsaturation thereof. When the polymers of the invention are copolymers, A will be the moiety of a single olefinic compound. In the case of terpolymers A can represent the moiety resulting from either ethylenically unsaturated compound and the two types oi such moieties will occur at random along the polymer chain. The polymer will have end groups or "caps", the nature of which will depend in part upon the materials present during the production of the polymer and whether and how the polymers are purified. The precise nature of the end groups is of little apparent significance insofar as the properties of the polymer are concerned and the polymer is fairly represented by the formula ior the polymeric chain as depicted above.

The unsaturated bicyclic carboxylic acid or carboxylic acid anhydride which is used as a monomer in the process of the invention is a compound having a carbon-carbon double bond as part of one ring in a compound having at least two rings at least one of which is sixmembered. At least one of two adjacent cazbon atoms in one ring contains a substituent which is carhoxyl or which, when both adjacent atoms are substituted, form a carboxylic acid anhydride group, i.e., a dioxycarbonyl group, i.e., a

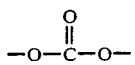

group. The preferred unsaturated bicyclic reactants are represented by the formula

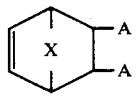

(II)

wherein X is methylene or oxy and A independently is hydrogen or carboxy or two A groups taken together form a carboxylic acid anhydride group, with the proviso that at least one A group is not hydrogen. Illustrative unsaturated bicyclic compounds include 5-norbornene-2,3-carboxylic acid anhydride, 5-norbornene-2,3-dicarboxylic acid and 5-norbornene-2-carboxylic acid as well as 1,4-endoxy-5.cyclohexene-2,3-dicarboxylic acid anhydride. The preferred unsaturated bicyclic compounds are those in which the term X Z5 of the above formula II is methylene and particularly preferred is 5-norbornene-2,3-dicarboxylic acid anhydride.

When the polymers of the invention are copolymers, the reaction mixture will contain carbon monoxide and the unsaturated bicyclic unsaturated compound, in addition to the higher alkanol and the catalyst composition. When it is desired to produce terpolymers, ethylene is additionally present in the reaction mixture and the resulting terpolymers will be linear alternating terpolymers of carbon monoxide, the unsaturated bicyclic compound and ethylene. The carbon monoxide and the ethylenically unsaturated reactants are contacted with the catalyst composition under polymerization conditions in the presence of the higher alkanol reaction diluent. The catalyst composition is that described in certain of the above published European Patent Applications and typically is formed from a compound of palladium, the anion of a strong non-hydrohalogenic acid, e.g., an acid having a pKa below 2, and a bidentate ligand of phosphorus. The scope of the polymerization is extensive but, without wishing to be limited, a preferred palladium compound is a palladium alkanoate such as palladium acetate and a preferred anion is the anion of trifluoroacetic acid or p-toluenesulfonic acid. The anion is preferably provided as a metal salt, particularly a non-noble transition metal salt such as copper salt or even as a salt of the palladium employed as the catalyst composition precursor, e.g., palladium trifluoroacetate. The anion is employed in a quantity from about 1 mol to about 1000 mols per mol of palladium, preferably from about 2 mols to about 100 mols per mol o: palladium.

The bidentate ligand of phosphorus is represented by the formula $$R_2P-R'-PR_2$$ (III)

wherein R independently is an aromatic group of up to 10 carbons which is hydrocarbyl containing only atoms of carbon and hydrogen such as phenyl, naphthyl, tolyl and xylyl. Alternatively, the R group is non-hydrocarbyl containing additional atoms in the form of polai substituents at least one of which is a substituent on a ring carbon atom located ortho to the carbon atorr through which the substituent is connected to the phosphorus. Illustrative non-hydrocarbyl R substituents include 2-methoxyphenyl, 2,4-dimethoxyphenyl, Z-ethoxyphenyl, 2,5-diethoxyphenyl, 2,6-di-n-propoxyphenyl and 2,4,6-trimethoxyphenyl. The R' group is a divalent connecting group of up to 10 carbon atoms with irom Z to 4 carbon atoms in the phosphorus-phosphorus bridge. Such R groups include 1,2-ethylene, 1,3-propylene, 2,2-dimethyl-1,3-propylene and 1,3-butylene. The preferred R' group is the 1,3-propylene or 1,3-trimethylene group. The preierred class of bidentate ligands of phosphorus comprises 1,3-(diphenylphosphino)propane and 1,3-bis[di(2-methoxylphenyl)-phosphino]propane. The bidentate ligand is employed in a quantity of from about 0.5 mol to about 10 moles per mol of palladium and preferably from about 0.75 mol to about 5 mols per mol of palladium.

In order to enhance the activity of the catalyst composition it is useful on occasion to include within the catalyst composition solution an organic oxidant. The 1,4-quinones are preferred for this purpose, e.g., 1,4-benzoquinone or 1,4-naphthoquinone, and particularly preferred is 1,4-benzoquinone. As stated, no quinone is required but an amount up to about 10,000 mols per mol of palladium is satisfactory. If employed, amounts of 1,4-quinone from about 10 mols to about 5000 mols per mol of palladium are preferred.

The catalyst should be employed in a quantity sufficient to provide from ahout $1 \times 10^{-7}$ mol to about $1 \times 10^{-3}$ mol per mol o: ethylenically unsaturated compound. More often, the catalyst is used In a quantity to provide from about $1 \times 10^{-6}$ mol to about $1 \times 10^{-4}$ mol per mol of ethylenically unsaturated reactant. The molar ratio of ethyIenIcaIIy unsaturated comPound to carbon monoxide is from about 10:1 to about 1:10, but molar ratios of from about 5:1 to about 1:5 are more common.

The monomeric reactants and the catalyst composition are contacted under polymerization conditions in the presence of a higher alkanol reaction diluent. The presence oi a higher alkanol is required for successful operation of the process of the invention since, as described in the above copending U.S. patent application Ser. 379,839, filed July 14, 1989, the use of the more conventional reaction diluent methanol precludes the production of terpolymers and copolymers are only obtained in the additional presence within the reaction mixture of ethylene or other lower α-olefin. Higher alkanols which are useful as reaction diluent in the process of the invention have at least 8 carbon atoms but preferably no more than 20 carbon atoms. Best results are obtained when an alkanol of from about 10 to about 18 carbon atoms is used. The higher alkanol is branched with one or more side-chain substituents or is straight chain without branches. Particularly preferred alkanols are straight-chain alkanols such as 1-octanol, 1-decanol, 1-dodecanol, 1-tetradecanol and 1-octadecanol. The role of the higher alkanol is two-fold. The alkanol provides the liquid medium in which the polymerization takes place but addItionally the higher alkanol reacts with at least a portion of the carboxylic acid or carboxylic acid anhydride moieties oi the polyketone polymer to produce higher alkyl esters of the bicyclic unsaturated compound and thereby introduce pendant higher alkyl groups onto the polymeric chain. The extent to which the higher alkanol reacts to form the higher alkyl esters will depend in part upon the relative proportions of the reactive materials present in the reaction mixture as well as the polymerization conditions. In a typical polymerization, however, about 50%, preferably from about 40% to about 60%, of the carboxylic acid functionality of the polyketone polymer is observed in the form of higher alkyl esters.

The contacting of the monomeric reaciants and the catalyst composition is conducted under polymerization conditions in the presence of the reaction diluent. The contacting is facilitated if some means of agitation is provided such as shaking or stirring. The polymerization conditions will customarily include a reaction temperature from about 30oC to about 150° C., particularly a reaction temperature from about 40° C. to about 130° C. The reaction pressure will be from about 5 bar to about 150 bar, preferably from about 10 bar to about 100 bar. Subsequent to polymerization, reaction is terminated as by cooling the reaction mixture and releasing the pressure. The polymer product is typically obtained as a material substantially insoluble in the medium of its production and is recovered by conventional methods such as filtration or decantation. The polymer product is used as recovered or is purified if desired by coniact with a solvent or extraction agent which is selective for catalyst residues.

The polymer product, in terms of the more general formula I is represented by the repeating formula

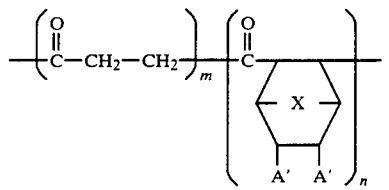
(Ia)

wherein X has the previously stated meaning and A' independently is A or carbalkoxy wherein the alkyl is the alkl moiety of the higher alkanol reaction diluent. When the process of the invention produces copolymers, the term m is zero. When m is other than zero, m is equal to or greater than n. Preferably, m is a value from about n to about 10 n.

The polymeric products are thermoplastics and have utilities conventionally associated with thermoplastic polymers. The products are processed by conventional procedures such as extrusion, injection molding and thermoforming into a variety of shaped articles such as containers for food and drink. Additionally, however, because of the increased hydrocarbon solubility associated with the pendant higher alkyl groups the polymers have applications such as pour point depressants for hydrocarbon motor oils.

The invention is further illustrated by the following Illustrative Embodiments which should not be regarded as limiting. In each Illustrative Embodiment a linear alternating polymer was produced wherein moieties derived from carbon monoxide alternate with moieties derived from ethylenically unsaturated compound. Also in each product, about 50% of the carbonyloxy groups were present in higher alkyl ester groups.

ILLUSTRATIVE EMBODIMENT I

A terpolymer of carbon monoxide, ethylene and 5-norbornene-2,3-dicarboxylic acid anhydride was prepared by charging 40 ml of 1-decanol and 10 g of 5-norbornene-2,3-carboxylic acid anhydride to an autoclave of 250 ml capacity equipped with a mechanical stirrer. A catalyst composition solution was added which comprised 0.1 mmol palladium acetate, 2 mmol rifluoroacetic acid and 0.15 mmol 1,3-bis(diphenylphosphino)-propane. After the air was removed from the autoclave by evacuation, ethylene was added until a pressure of 20 bar was reached and carbon monoxide was added until a total pressure of 50 bar was reached. The contents of the autoclave were then heated to 85° C. After 2 hours the polymerization was terminated by cooling to ambient temperature and releasing the pressure. The yield of terpolymer was 26 g.

ILLUSTRATIVE EMBODIMENT 11

A copolymer of carbon monoxide and 5-norbornene-2,3-dicarboxylic acid anhydride was produced by a process substantially similar to that of 11)ustrative Embodiment I except that no ethylene was added (the total pressure was 30 bar) and polymerization was conducted at 85° C ior 30 minutes and then at 120° C. for 4.5 hours. The yield of copolymer was 16 g.

ILLUSTRATIVE EMBODIMENT III

A terpolymer of carbon monoxide, ethylene and 5-norbornene-2,3-dicarboxylic acid anhydride was produced by a process substantially similar to that of Illustrative Embodiment I except that the autoclave contained a mixture of 1-tetradecanol and 10 g of 5-norbornene-2,3-dicarboxylic acid anhydride which had been warmed to 50° C. and upon addition of the reaction mixture components the contents of the autoclave were heated to 110° C. and maintained for 1.5 hr. The yield of terpolymer was 20 g.

ILLUSTRATIVE EMBODIMENT IV

The procedure of Illustrative Embodiment III was substantially repeated except that the contents of the autoclave were maintained at 70° C. for 10 hours instead of at 110° C. for 1.5 hours. The yield of terpolymer was 21 g.

ILLUSTRATIVE EMBODIMENT V

The procedure of Illustrative Embodiment I was substantially repeated except that the autoclave contained a mixture of 1-octadecanol and 10 g of 5-norbornene-2,3-dicarboxylic acid anhydride which had been warmed to 70° C., and upon addition of the reaction mixture components the contents of the autoclave were heated to 75° C. and maintained at this temperature for 10 hours. The yield of terpolymer was 30 g.

What is claimed is:

1. A process for the production of linear alternating polymers containing pendant higher alkyl carboxylate groups by contacting carbon monoxide, and bicyclic unsaturated carboxylic acid or carboxylic acid anhydride, under polymerization conditions in the presence of a higher alkanol and a catalyst composition formed from a palladium compound, the anion of a strong non-hydrohalogenic acid and a bidentate ligand of phosphorus.

2. The process of claim 1 wherein the bicyclic unsaturated compound is represented by the formula

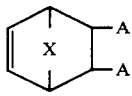

wherein X is methylene or oxy and A independently is hydrogen or carboxy, or both A groups taken together are carboxylic acid anhydride, with the proviso that at least one A group is not hydrogen.

3. The process of claim 2 wherein the higher alkanol has at least 8 but not more than 30 carbon atoms.

4. The process of claim 3 wherein the bicyclic unsaturated compound is 5-norbornene-2,3-dicarboxylic acid anhydride.

5. The process of claim 4 wherein the higher alkanol has from about 10 to about 18 carbon atoms.

6. The process of claim 3 wherein ethylene is present and the linear alternating polymer produced is a terpolymer.

7. The process of claim 6 wherein the bicyclic unsaturated compound is 5-norbornene-2,3-dicarboxylic acid anhydride.

8. The process of claim 7 wherein the higher alkanol has from about 10 to about 18 carbon atoms.

9. A process of producing linear alternating polymers having pendant carbalkoxy groups by contacting carbon monoxide and 5-norbornene-2,3-dicarboxylic acid anhydride, under polymerization conditions, in the presence of an alkanol reaction diluent of at least 8 but no more than 30 carbon atoms and a catalyst composition formed fro mpalladium acetate, the anion of trifluoroacetic acid or p-toluenesulfonic acid, and 1,3-bis(diphenylphosphino)propane or 1,3-bis[di(2-methoxyphenyl)phosphino] propane.

10. The process of claim 9 wherein ethylene is present and the polymer produced is a terpolymer.

11. The process of claim 10 wherein the alkanol has from about 10 to about 18 carbon atoms.

12. A linear alternating polymer of carbon monoxide, a bicyclic unsaturated carboxylic acid or carboxylic acid anhydride, and ethylene, wherein the polymer is represented by the repeating unit formula

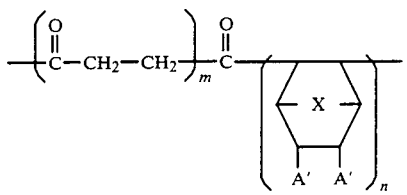

wherein X is methylene or oxy, A independently is carbalkoxy or A wherein A is hydrogen or carboxy or two A groups taken together are dioxycarbonyl with the proviso that at least one A group is other than hydrogen, and m is equal to or greater than n.

13. The polymer of claim 12 wherein X is methylene.

14. The polymer of claim 13 wherein the alkyl has from about 10 to about 18 carbon atoms.

15. The polymer of claim 14 wherein m is from about n to about 10 n.

* * * * *